(12) United States Patent
Sendra et al.

(10) Patent No.: US 12,518,237 B2
(45) Date of Patent: Jan. 6, 2026

(54) WHOLE SELF PORTFOLIO

(71) Applicant: SAP SE, Walldorf (DE)

(72) Inventors: Caitlynn Sendra, Mount Prospect, IL (US); Scott Lietzke, Forestville, CA (US); Julie Bartholic, San Luis Obispo, CA (US); Stacie Overbaugh, Danville, CA (US); Autumn Krauss, Evergreen, CO (US); Patrick Ashamalla, Oakton, VA (US)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 18/454,962

(22) Filed: Aug. 24, 2023

(65) Prior Publication Data

US 2024/0078497 A1 Mar. 7, 2024

Related U.S. Application Data

(60) Provisional application No. 63/374,641, filed on Sep. 6, 2022.

(51) Int. Cl.
*G06Q 10/0639* (2023.01)
(52) U.S. Cl.
CPC .............................. *G06Q 10/06398* (2013.01)
(58) Field of Classification Search
CPC ........... G06Q 10/063; G06Q 10/06398; G06Q 10/0639; G06Q 10/105; G06Q 10/1053; G06Q 10/10
See application file for complete search history.

(56) References Cited

U.S. PATENT DOCUMENTS

| 9,715,532 B1 | 7/2017 | Hall et al. |
| 10,412,189 B2 | 9/2019 | Bollinger et al. |
| 10,628,212 B2 | 4/2020 | Bradshaw et al. |
| 10,762,902 B2 | 9/2020 | Garikapati et al. |

(Continued)

FOREIGN PATENT DOCUMENTS

WO WO-2023159332 A1 * 8/2023 ......... G06Q 10/1053

OTHER PUBLICATIONS

Psychological Capital and Beyond, Oxford University Press, USA, Mar. 2015, 318 pages.

(Continued)

*Primary Examiner* — William S Brockington, III
(74) *Attorney, Agent, or Firm* — Fish & Richardson P.C.

(57) ABSTRACT

The present disclosure involves systems, software, and computer implemented methods for performing human capital management. One example method includes receiving a set of experience data of a user as unstructured data, converting the unstructured experience data into structured experience data of the user, receiving a set of personality data of the user as unstructured data, converting the unstructured personality data into structured personality data of the user, receiving a set of motivational and preferences data of the user as unstructured data, converting the unstructured motivational and preferences data into structured motivational and preferences data of the user. The structured experience data, the structured personality data, and the structured motivational and preferences data are combined into a user profile, which is stored in a database. An opportunity is recommended to the user based on the user profile.

18 Claims, 9 Drawing Sheets

(56) References Cited

U.S. PATENT DOCUMENTS

| | | |
|---|---|---|
| 10,778,638 B2 | 9/2020 | Brockington et al. |
| 11,113,738 B2 | 9/2021 | Iu et al. |
| 11,157,298 B2 | 10/2021 | Mathew |
| 11,216,452 B2 | 1/2022 | Chapman et al. |
| 11,221,843 B2 | 1/2022 | Me et al. |
| 11,221,845 B2 | 1/2022 | Me et al. |
| 11,250,063 B2 | 2/2022 | Krasadakis |
| 11,250,102 B2 | 2/2022 | Laddha et al. |
| 11,625,450 B1 | 4/2023 | Roman et al. |
| 11,675,782 B2 | 6/2023 | Chapman et al. |
| 2013/0311416 A1* | 11/2013 | Liu ................. G06Q 10/06 706/46 |
| 2014/0089207 A1 | 3/2014 | Manzano et al. |
| 2015/0095303 A1* | 4/2015 | Sonmez ................. G06N 5/01 707/707 |
| 2017/0091326 A1 | 3/2017 | Chernyak et al. |
| 2017/0132331 A1 | 5/2017 | Pepakayala et al. |
| 2017/0185942 A1* | 6/2017 | Hickson ......... G06Q 10/063118 |
| 2019/0050750 A1 | 2/2019 | Hoan et al. |
| 2019/0087490 A1 | 3/2019 | Liu et al. |
| 2019/0095869 A1* | 3/2019 | Zhang ................. G06F 16/9535 |
| 2019/0102742 A1 | 4/2019 | Agrawal et al. |
| 2019/0138282 A1 | 5/2019 | Keller et al. |
| 2019/0228446 A1 | 7/2019 | Doni et al. |
| 2019/0238515 A1 | 8/2019 | Dodd et al. |
| 2020/0234606 A1* | 7/2020 | Anders .................... G09B 7/00 |
| 2022/0207038 A1 | 6/2022 | Cenciotti et al. |
| 2022/0253962 A1 | 8/2022 | Wright et al. |
| 2022/0366377 A1 | 11/2022 | Silva |

OTHER PUBLICATIONS

The Psychology of Hope: You can get there from here, The Free Press, 1994, 428 pages.

Toth et al., "Disentangling the elements of PsyCap as drivers for work, organization and social engagement in knowledge-intensive work." Personnel Review, 2022, 17 pages.

* cited by examiner

WHOLE SELF PORTFOLIO

CROSS REFERENCE TO RELATED APPLICATIONS

This application claims priority to and the benefit of U.S. Provisional Application No. 63/374,641, filed Sep. 6, 2022, which is incorporated by reference in its entirety.

TECHNICAL FIELD

The present disclosure relates to computer-implemented methods, software, and systems for human capital management.

BACKGROUND

Human capital management provides a mechanism to measure capability of a person's current role or potential future role. Current human capital management solutions focus on personal experience (such as educational and work experience) to measure capability of a person.

SUMMARY

The present disclosure involves systems, software, and computer implemented methods for performing human capital management. An example method includes receiving a set of experience data of a user as unstructured data, and converting the set of unstructured experience data into structured experience data of the user. A set of personality data of the user is received as structured data, and a set of motivational and preferences data of the user is received as unstructured data. The unstructured motivational and preferences data is converted into structured motivational and preferences data of the user. The structured experience data, the structured personality data, and the structured motivational and preferences data are combined into a user profile, which is stored in a database. User data is received in at least one application, and the user data is compared to the motivation and preferences data to determine if there have been any changes. In response to determining changes based on comparing the user data to the motivation and preferences data, a second set of motivation and preferences data of the user are received, and the user profile is updated to include the second set of motivation and preferences data. Opportunity profiles are retrieved that contain scores for opportunities. The retrieved opportunity profiles are compared with the updated user profile, and at least one opportunity is recommended to the user based on the user profile.

In some instances, combining the structured experience data, the structured personality data, and the structured motivational and preferences data into the user profile can include obtaining passion data from the user and using the passion data to apply at least one weight to at least one piece of data from either the structured experience data, the structured personality data, and the structured motivational and preferences data. The at least one weight and the structured experience data, the structured personality data, and the structured motivational and preferences data can be processed through a machine learning model to generate the user profile.

In some instances, recommending the opportunity to the user based on the user profile includes calculating a compatibility of the user profile to a set of opportunity profiles, wherein each opportunity profile is associated with an opportunity, and then generating an output result of at least one opportunity indicating a relative level of matching of the user profile to at least one opportunity profile. In some of those instances, the opportunity includes a new project opportunity, and recommending the opportunity to the user based on the user profile comprises automatically recommending the new project opportunity to the user if the output result is greater than a predefined threshold. In some other instances, the opportunity includes a new team opportunity, and recommending the opportunity to the user based on the user profile comprises automatically recommending the new team opportunity to the user if the output result is greater than a predefined threshold. In still other instances, the opportunity includes a new skill training opportunity, and recommending the opportunity to the user based on the user profile comprises automatically recommending the new skill training opportunity to the user if the output result is greater than a predefined threshold. In another instances, the opportunity includes a new leadership opportunity, and recommending the opportunity to the user based on the user profile comprises automatically recommending the new leadership opportunity to the user if the output result is greater than a predefined threshold.

In some instances, the set of experience data is related to educational and work experience of the user, and includes data associated with one or more of technical skills, professional skills, competencies, formal education, work and volunteer experience, badges, certifications, credentials, and patents.

In some instances, the set of personality data is related to relatively strengths and styles of the user, and includes a core set of personality traits of the user.

In some instances, the core set of personality traits includes openness to experience, conscientiousness, extraversion, agreeableness, and neuroticism.

In some instances, the set of motivational and preferences data includes data associated with one or more of work preferences, interests, aspirations, motivations, and mindsets.

In some instances, the set of experience data, the set of personality data, and the set of motivational and preferences data are obtained from different data sources.

In some instances, the set of experience data is obtained from one or more social media accounts of the user, the set of personality data is obtained from a third-party system providing a psychological test, and the set of motivational and preferences data is obtained from the user.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
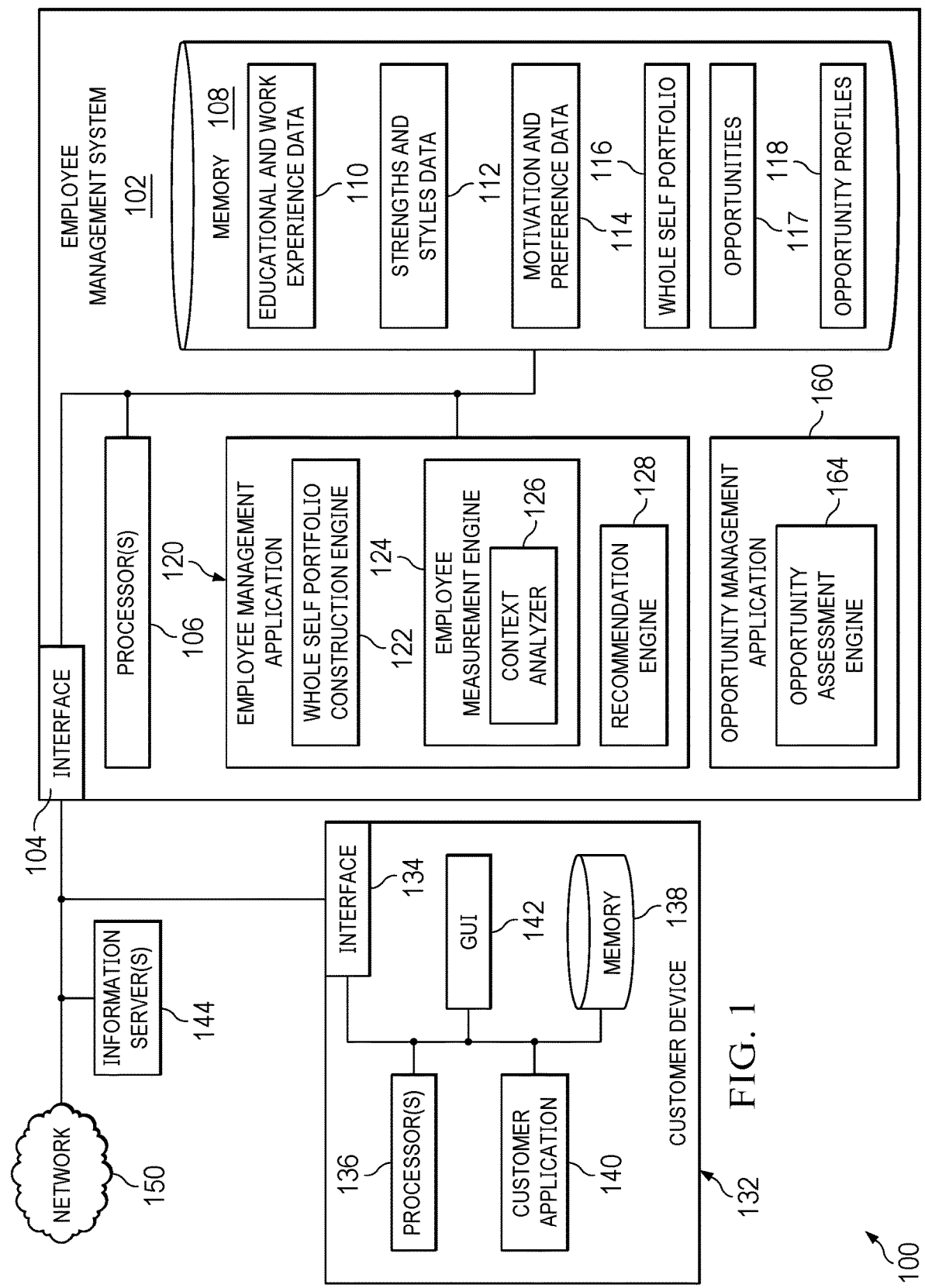
FIG. 1 is a block diagram illustrating an example computer system for performing human capital management.

The following detailed description describes a computer system and method to assist in human capital management. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Human capital management computer systems and methods collect and store employee skills and competency data to measure the capabilities of employees in their current roles or potential future roles. Skills and competencies can be associated with employees based on their roles and job descriptions. In addition, skills and competencies can be used for development purposes, such that performance is enhanced through knowledge enrichment. In general, skills can be acquired through jobs and experiences, as well as from development activities and training. However, skills can also be acquired from learnings or experiences outside of work. Additionally, skills may be acquired in both formal and informal means, including both specific classes or trainings, as well as through experiences and life events. In some instances, obtained skills may be skills that are not associated with a particular person's role, but skills unrelated to at least a set of core tasks for a user. In measuring employee competencies, existing human capital management solutions focus on personal experience (such as educational and work experience) without considering employees' inherent motivation. These solutions are flawed, as employees themselves are not the capital of an organization. Employees are "capitalists" and "investors" who choose how much to invest in their work based on risk, return, and opportunity costs. In short, employees perform better, are more satisfied, and have higher psychological capital when they have not only the matching skills and competencies, but the work matches their motivations and interests.

In addition, people change over time. Thus, some aspects of a person are static once established (e.g., where and when a person received her college degree), while other aspects will vary with time (e.g., charting a different course in a career path). Being able to proactively engage with an employee based on who the whole person is—and wants to become—is very important. In addition, a person's motivations and preferences can change over time. Being able to detect changes in this data so as to provide up-to-date opportunities that match an employee's current self is very important in keeping employees in general, but especially keeping them engaged at a high level.

Different from existing solutions, this specification introduces the use of a new data collection and aggregation system to generate a new multi-dimensional user data set (i.e., a user portfolio) for human capital management. In addition to traditional employee data, the user portfolio also includes employee motivation, innate traits, and psychological capital data. Employee motivation and psychological capital data, which include hope, optimism, self-efficacy, and resilience, have been demonstrated to be stronger performance predictors than mere skills and competencies. As a result, the present solution is an improvement from a skills and competencies only model, with the new user portfolio model providing better predictions of employee readiness and performance. For example, the user portfolio includes not only individual's potential capabilities (such as, experience, education, and past performance), but also his or her innate traits and motivation drivers (such as, aspirations, preferences, and motivations). The multi-dimensional view facilitates an understanding of what is meaningful to the individual and what helps generate performance, impact, and satisfaction. By creating a personal connection between work and personal motivation, the user portfolio can bolster employee sentiment through job fit, which can lead to improved performance. Similar technologies can be used in any interpersonal solution, including job opportunities, skills training opportunities, volunteer opportunities, mentor-related assignments, career development plans, talent discovery, team building and cohesion, and any other suitable implementation.

Turning to the illustrated embodiment, FIG. 1 is a block diagram illustrating an example computer system 100 for generating a whole self profile and providing recommendations in a human capital management system. Specifically, the illustrated system 100 includes or is communicably coupled with an employee management system 102, a customer device 132, one or more information server(s) 144, and a network 150. Although shown separately, in some implementations, functionality of two or more systems or servers may be provided by a single system or server. In some implementations, the functionality of one illustrated system, server, or component may be provided by multiple systems, servers, or components, respectively.

As used in the present disclosure, the term "computer" is intended to encompass any suitable processing device. For example, although FIG. 1 illustrates a single employee management system 102 and a single customer device 132, the system 100 can be implemented using a single, stand-alone computing device, two or more servers, and/or two or more customer devices. Indeed, the employee management system 102 may be any computer or processing device such as, a blade server, general-purpose personal computer (PC), Mac®, workstation, UNIX-based workstation, or any other suitable device. In other words, the present disclosure contemplates computers other than general-purpose computers, as well as computers without conventional operating systems. Further, the employee management system 102 and the customer device 132 may each be adapted to execute any operating system, including Linux, UNIX, Windows, Mac OS®, Java™, Android™, iOS, or any other suitable operating system. According to one implementation, the employee management system 102 may also include or be communicably coupled with one or more information servers 144 as illustrated in FIG. 1. For example, the information servers 144 may include, among others, a communication server, an e-mail server, a web server, a caching server, a streaming data server, and/or other suitable servers or computers. These servers 144 may associated with, or may be, related to social media services or application, entertainment platforms, information services, retail solutions and websites, and communication servers (e.g., email or chat features). These various servers 144 allow the system to collect data relevant to users from or at these servers 144, and can use that relevant data to develop the whole self profile. In some instances, the servers 144 may be "third-party" servers (e.g., related to social media and/or other data repositories), but some may be email or other servers owned or managed by the organization providing the whole self profile. A combination of such information can be collected from two or more information servers 144.

Organizations, such as small and midsize enterprises (SMEs), large enterprises, or other types of organizations, can use the employee management system 102 for employee management. In general, employee management system 102 may be any suitable computing server or system executing applications related to requests for performing employee management including, for example, opportunity recommendations. The employee management system 102 is described herein in terms of responding to requests for performing employee management and other data from users at customer device 132 and other clients, as well as other systems communicably coupled to network 150 or directly connected to the employee management system 102. However, the employee management system 102 may, in some implementations, be a part of a larger system providing additional functionality. For example, employee management system 102 may be part of an enterprise business application or application suite providing one or more of enterprise relationship management, data management systems, customer relationship management, and others. In one example, employee management system 102 may generate or receive a request to provide an opportunity recommendation for an employee, obtain current available opportunities, access a user portfolio of the employee from a database, process the user portfolio and the available opportunities through a machine learning model to identify one or more opportunities, and respond to the requestor change in data with the one or more opportunities. The machine learning model can be trained and enhanced with the employee's input and feedback. In some implementations, the employee management system 102 may be associated with a particular uniform resource locator (URL) for web-based applications. The particular URL can trigger execution of multiple components and systems.

As illustrated, employee management system 102 includes an interface 104, one or more processors 106, memory 108, and an employee management application 120. In general, the employee management system 102 is a simplified representation of one or more systems and/or servers that provide the described functionality, and is not meant to be limiting, but rather an example of the systems possible.

The interface 104 is used by the employee management system 102 for communicating with other systems in a distributed environment—including within the system 100—connected to the network 150 (e.g., customer device 132, information server(s) 144, and other systems communicably coupled to the network 150). Generally, the interface 104 may comprise logic encoded in software and/or hardware in a suitable combination and operable to communicate with the network 150. More specifically, the interface 104 may comprise software supporting one or more communication protocols associated with communications, such that the network 150 or interface's hardware is operable to communicate physical signals within and outside of the illustrated system 100.

Network 150 facilitates wireless or wireline communications between the components of the system 100 (e.g., between employee management system 102 and customer device 132 and among others), as well as with any other local or remote computer, such as additional clients, servers, or other devices communicably coupled to network 150, including those not illustrated in FIG. 1. In the illustrated system, the network 150 is depicted as a single network, but may be comprised of more than one network without departing from the scope of this disclosure, so long as at least a portion of the network 150 may facilitate communications between senders and recipients. In some instances, one or more of the illustrated components may be included within network 150 as one or more cloud-based services or operations. For example, the employee management system 102 may be a cloud-based service. The network 150 may be all or a portion of an enterprise or secured network, while in another instance, at least a portion of the network 150 may represent a connection to the Internet. In some instances, a portion of the network 150 may be a virtual private network (VPN). Further, all or a portion of the network 150 can comprise either a wireline or wireless link. Example wireless links may include 802.11ac/ad/af/a/b/g/n, 802.20, WiMax, LTE, and/or any other appropriate wireless link. In other words, the network 150 encompasses any internal or external network, networks, sub-network, or combination thereof operable to facilitate communications between various computing components inside and outside the illustrated system 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the employee management system 102 includes one or more processors 106. Each processor 106 may include a central processing unit (CPU), an application-specific integrated circuit (ASIC), a field-programmable gate array (FPGA), or another suitable component. Generally, each processor 106 executes instructions and manipulates data to perform the operations of the employee management system 102. Specifically, each processor 106 executes the algorithms and operations described in the illustrated figures, including the operations performing the functionality associated with the employee management system 102 generally, as well as the various software modules (e.g., the employee management application 120), including the functionality for sending communications to and receiving transmissions from customer device 132.

The employee management system 102 also includes an employee management application 120. The employee management application 120 provides an opportunity recommendation method using a whole self portfolio construction engine 122. In operation, the employee management application 120 constructs a user portfolio based on different sets of user data (such as, user experience data, user personality data, and user preference data), provides an opportunity recommendation for a user by processing the user portfolio through a machine learning model, and trains the machine learning model using the use's input and feedback. Operations of the employee management application 120 are executed by the one or more processors 106. In some implementations, the employee management application 120 may be a software program, or set of software programs, executing on the employee management system 102. In various alternative implementations, the employee management application 120 may also be an external component from the employee management system 102 and may communicate with the employee management system 102 over a network (e.g., network 150).

As shown, the employee management application 120 includes the whole self portfolio construction engine 122. The whole self portfolio construction engine 122 constructs a multi-dimensional and complete user data set (e.g., a whole self portfolio) for a user. In operation, the whole self portfolio construction engine 122 may obtain a first set of data related to experience of the user, obtain a second set of data related to personality of the user, obtain a third set of data related to motivation and preference of the user, and combine the first, second, and third sets of data into a user portfolio. For example, the first set of data can include data obtained directly from the user (e.g., from answered questions on a job application form such as, "What relevant classes did you take for your degree from college?") and can also include data inferred from user input (e.g., if the person lists software experience but is filling out a job application for a management position, it can be inferred that the software experience is important, but is not determinative of what type of position the applicant is seeking), or data stored as part of a human resources information system (HRIS) sources (such as, employee activities, achievement records, projects, learning and development, team activities, and goal achievement), and peer or manager feedback. In other instances, experience can be inferred from available information, or from actions taken by the person. Examples include when a person fills out a job application for a management position. Based on that action, some management skills can be inferred. In some instances, an employee may log an achievement in a performance management system from which a particular experience can be identified. Based on that experience, an inference as to management skills, or skills related to the achievement can be inferred. In some instances, the user or employee may have the opportunity to validate the inference as accurate or inaccurate before the skill and/or experience is associated with the employee's profile.

In one implementation, employee management system 102 can collect experience data from both structured and unstructured sources. For structured data collection, the user typically answers questions directly. As an example, a prompt on a computer UI may ask the question, "How many years have you been working for employee [list previous employer]?" The typed response by the user is stored in a data field that may be labeled "Years of Work Experience," that is associated with another data field labeled "Previous Employer." Information about particular job experience can also be obtained via prompts, as well as inferred from submitted information or available information related to other CVs or resumes.

To collect unstructured data, employment management system 102 may receive a scanned copy of a paper document where the scanner uses optical scan recognition. The scanned data is received and processed through a context analyzer. The context analyzer then takes certain data entries and assigns them proper labels for later retrieval and processing (i.e., converts the unstructured data to structured data). In other instances, unstructured data may be obtained via data entry, from documents scanned using optical character recognition (OCR), from digital files or documents associated with users, or any other suitable source.

Some data points are static and others are dynamic. An example of a static data point would be a college degree. Once a college degree is obtained, it does not change. A resume or CV is another example of static data as these documents are typically used in changing employers. Thus, once a resume or CV is on file with the current employer, it is rare for the employee to update the resume or CV with her current employer. Work experience, however, is dynamic. As an example, every year an employee remains in a particular job is one more year of work experience in that job. So how some data is saved can be either static (e.g. a resume' or CV) or dynamic (e.g., a person's continued employment with one employer). While resumes or CVs may not be specifically collected in some implementations, data from those resumes or CVs can be inferred into Whole Self Model elements. For example, a first user may have a certification listed on their resume. That certification may be static, or it may be dynamic, as skill expertise should be updated over time. For example, technical skills may become obsolete as technology evolves. Further, certifications are often associated with expiration dates. Another example of static data can be innate traits of a user. These traits are more stable, and usually may only change gradually, if at all, over long periods of time. Some example innate traits may include being an introvert or extrovert, among others.

The second set of data can be obtained from personality tests (such as the Big Five personality test), self-evaluations, and observed behavior capture.

The third set of data can be obtained from direct user input or inferred from other user activities. This third set of data can be called expressive state data, motivational data or preference data.

By considering different sets of user data, the user portfolio provides an intelligent assembly of multiple data sources designed to create current, fluid, and up-to-date stories of the user and his or her future direction. In some implementations, the whole self portfolio construction engine 122 may generate a first pass at a whole self portfolio for an individual and then solicit feedback from that person as to the accuracy or correctness of that portfolio. The direct user input and/or the user feedback can be used to train and enhance the machine learning model to improve recommendation accuracy. Operations of the whole self portfolio construction engine 122 are executed by the one or more processors 106. In some implementations, the whole self portfolio construction engine 122 may be a software program, or set of software programs, executing on the employee management system 102. In various alternative implementations, the whole self portfolio construction engine 122 may also be an external component from the employee management system 102 and may communicate with the employee management system 102 over a network (e.g., network 150).

The employee management application 120 also includes the employee measurement engine 124. The employee measurement engine 124 includes a context analyzer 126 that provides context and structure for received unstructured data. In addition, the employee measurement engine 124 tracks user activity to determine if either a user reassessment is necessary, or if the user may be interested in receiving information about an opportunity. In one implementation, employee measurement engine 124 determines whether a user's expressive state data has changed over time such that a new opportunity presented to the user may be of interest to the user.

Recommendation engine 128 compares a user's whole self profile with opportunity profiles, and can then automatically recommend or add an opportunity for a user. In operation, the recommendation engine 128 calculates a compatibility of the user to one or more opportunities 117 and, generates an output result indicating a relative level of matching of the user to the one or more opportunities 117, and presents or select opportunities 117 to the user if the output result is greater than a predefined threshold. The opportunity 117 can include a new project, a new team, a new skill training session, a new leadership opportunity, a certain career path, or a certain career development program, among others. For example, an employee can use the employee management application 120 to request career development recommendations. Based on the employee's portfolio, the employee management application 120 can identify and present any available organizational opportunity matching the employee's portfolio to the employee. In some instances, the employee management application 120 can automatically match the identified organizational opportunity with the employee or add the employee to a candidate pool of the organizational opportunity. Operations of the recommendation engine 128 are executed by the one or more processors 106. In some implementations, the recommendation engine 128 may be a software program, or set of software programs, executing on the employee management system 102. In various alternative implementations, the recommendation engine 128 may also be an external component from the employee management system 102 and may communicate with the employee management system 102 over a network (e.g., network 150).

Regardless of the particular implementation, "software" includes computer-readable instructions, firmware, wired and/or programmed hardware, or any combination thereof on a tangible medium (transitory or non-transitory, as appropriate) operable when executed to perform at least one of the processes and operations described herein. In fact, each software component may be fully or partially written or described in any appropriate computer language, including C, C++, JavaScript, JAVA™, VISUAL BASIC, assembler, Perl®, any suitable version of 4GL, as well as others. While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate.

As illustrated, employee management system 102 includes memory 108. In some implementations, the employee management system 102 includes multiple memories. The memory 108 may include any memory or database module and may take the form of volatile or non-volatile memory including, without limitation, magnetic media, optical media, random access memory (RAM), read-only memory (ROM), removable media, or any other suitable local or remote memory component. The memory 108 may store various objects or data, including financial and/or business data, application information including URLs and settings, user information, behavior and access rules, administrative settings, password information, caches, backup data, repositories storing business and/or dynamic information, and any other appropriate information including any parameters, variables, algorithms, instructions, rules, constraints, or references thereto associated with the purposes of the employee management system 102. Additionally, the memory 108 may store any other appropriate data, such as VPN applications, firmware logs and policies, firewall policies, a security or access log, print or other reporting files, as well as others. For example, illustrated memory 108 includes educational and work experience data 110, strengths and styles data 112, motivation and preference data 114, and whole self portfolio 116, opportunities 117, and opportunity profiles 118.

The educational and work experience data 110 stores user data related to an individual's skills and expertise. For example, the educational and work experience data 110 can include one or more of skills (such as, technical skills and professional skills), experience (such as, work experience and volunteer experience), education (such as college degree and major), certification, languages, publications, awards, and other data (such as patents). The strengths and styles data 112 stores user data related to an individual's innate traits. The strengths and styles data 112 can include one or more of personality dimensions, openness to experience, conscientiousness, extraversion, agreeableness, and neuroticism. These sets of information can be received through any suitable manner, including personality tests, self-evaluations, and observed behavior capture. For example, the information can be obtained through validated psychometric assessments. The assessments may include reviews, personality tests (such as the Big Five personality test), and other suitable forms. The assessments may be administered within or outside an organization, and may vary based upon desired attribute types (such as, innate strengths for leadership, interpersonal communications, team dynamics, and approaches to work and problem-solving). The motivation and preference data 114 stores user data relates to an individual's interests and preferences. For example, the motivation and preference data 114 can include one or more of motivations, aspirations, mindsets, work preferences, and passions. The whole self portfolio 116 stores user portfolios, each providing a multi-dimensional and holistic view of the corresponding user. For example, the whole self portfolio 116 can include data from the educational and work experience data 110, the strengths and styles data 112, and the motivation and preference data 114.

Employee management system 102 also contains opportunity management application 160. Similar to the employee management application 120, opportunity management application 160 evaluates opportunities so the recommendation engine 128 can provide matching opportunities. Opportunity management application 160 includes opportunity assessment engine 164. The opportunity assessment engine 164 receives opportunities 117 from memory 108 and evaluates them to extract relevant portions that can be used by the recommendation engine 128. The relevant portion from an opportunity are then stored as opportunity profiles 118 in memory 108.

Customer device 132 may be any computing device operable to connect to or communicate with employee management system 102, other information servers 144, other clients (not illustrated), or other components via network 150, as well as with the network 150 itself, using a wireline or wireless connection, and can include a desktop computer, a mobile device, a tablet, a server, or any other suitable computer device. In general, customer device 132 comprises an electronic computer device operable to receive, transmit, process, and store any appropriate data associated with the system 100 of FIG. 1.

As illustrated, customer device 132 includes an interface 134, one or more processors 136, a graphical user interface (GUI) 142, a customer application 140, and memory 138.

Interface 134 and one or more processors 136 may be similar to, or different than, interface 104 and one or more processors 106 described with regard to employee management system 102. In general, each processor 136 executes instructions and manipulates data to perform the operations of the customer device 132. Specifically, each processor 136 can execute some or all of the algorithms and operations described in the illustrated figures, including the operations performing the functionality associated with the customer application 140 and the other components of customer device 132. Similarly, interface 134 provides the customer device 132 with the ability to communicate with other systems in a distributed environment—including within the system 100—connected to the network 150.

The customer device 132 includes or presents the GUI 142. For example, the GUI 142 provides a user interface between a user and the customer application 140. In some operations, the user uses the GUI 142 to request an opportunity recommendation. For example, the GUI 142 may display multiple fields (e.g., interests and work preferences) for the user to input data and to make a request to run the opportunity recommendation process. In some implementations, the GUI 142 may display multiple opportunities recommended by the opportunity recommendation process for the user to select. In some implementations, the GUI 142 may be a software program, or set of software programs, executing on the customer device 132. The GUI 142 may also be an external component from the customer device 132 and may communicate with the customer device 132 over a network (e.g., network 150).

The GUI 142 of the customer device 132 interfaces with at least a portion of the system 100 for any suitable purpose, including generating a visual representation of the customer application 140 and/or other applications. In particular, the GUI 142 may be used to view and navigate various Web pages, or other user interfaces. Generally, the GUI 142 provides the user with an efficient and user-friendly presentation of business data provided by or communicated within the system. The GUI 142 may comprise a plurality of customizable frames or views having interactive fields, pull-down lists, and buttons operated by the user. The GUI 142 contemplates any suitable graphical user interface, such as a combination of a generic web browser, intelligent engine, and command line interface (CLI) that processes information and efficiently presents the results to the user visually.

The customer device 132 can include one or more client applications, including the customer application 140. In general, a client application is any type of application that allows the customer device 132 to request and view content on the respective device. In some implementations, a client application can use parameters, metadata, and other information received at launch to access a particular set of data from the employee management system 102. In some instances, a client application may be an agent or client-side version of the one or more enterprise applications running on an enterprise server (not shown). Customer application 140 may work with one or more other information servers 144. In addition, a user's interactions with customer application 140 may be forwarded to employee measurement engine 124, so that the employee measurement engine 124 may detect if any of the user's expressive states have changed.

Customer device 132 executes the customer application 140. The customer application 140 may operate with or without requests to the employee management system 102—in other words, the customer application 140 may execute its functionality without requiring the employee management system 102 in some instances, such as by accessing data stored locally on the customer device 132. In others, the customer application 140 may be operable to interact with the employee management system 102 by sending requests via network 150 to the employee management system 102 for performing human capital management. For example, a user can use the customer application 140 to request an opportunity recommendation (such as, a new job opportunity, a particular skill learning course, and a certain career path). In some implementations, the customer application 140 may be a standalone web browser, while in others, the customer application 140 may be an application with a built-in browser. The customer application 140 can be a web-based application or a standalone application, developed for the particular customer device 132. For example, the customer application 140 can be a native iOS application for iPad, a desktop application for laptops, as well as others.

Memory 138 may be similar to or different from memory 108 of the employee management system 102. In some implementations, the customer device 132 includes multiple memories. In general, memory 138 may store various objects or data, including any parameters, variables, algorithms, instructions, rules, constraints, or references thereto, associated with the purposes of the customer device 132. Additionally, the memory 138 may store any other appropriate data, such as VPN applications, firmware logs and policies, firewall policies, a security or access log, print or other reporting files, as well as others.

The illustrated customer device 132 is intended to encompass any computing device such as a desktop computer, laptop/notebook computer, mobile device, smartphone, personal data assistant (PDA), tablet computing device, one or more processors within these devices, or any other suitable processing device. For example, the customer device 132 may comprise a computer that includes an input device, such as a keypad, touch screen, or other device that can accept user information, and an output device that conveys information associated with the operation of the customer application 140 or the customer device 132 itself, including digital data, visual information, or the GUI 142, as shown with respect to the customer device 132. Further, while illustrated as a client system, customer device 132 may be exchanged with another suitable source for performing human capital management in other implementations, and is not meant to be limiting.

There may be any number of customer devices 132 associated with, or external to, the system 100. For example, while the illustrated system 100 includes one customer device 132, alternative implementations of the system 100 may include multiple customer devices 132 communicably coupled to the employee management system 102 and/or the network 150, or any other number suitable to the purposes of the system 100. Additionally, there may also be one or more additional customer devices 132 external to the illustrated portion of system 100 that are capable of interacting with the system 100 via the network 150. Further, the term "client", "client device" and "user" may be used interchangeably as appropriate without departing from the scope of this disclosure. Moreover, while the customer device 132 is described in terms of being used by a single user, this disclosure contemplates that many users may use one computer, or that one user may use multiple computers.

Figure 2:
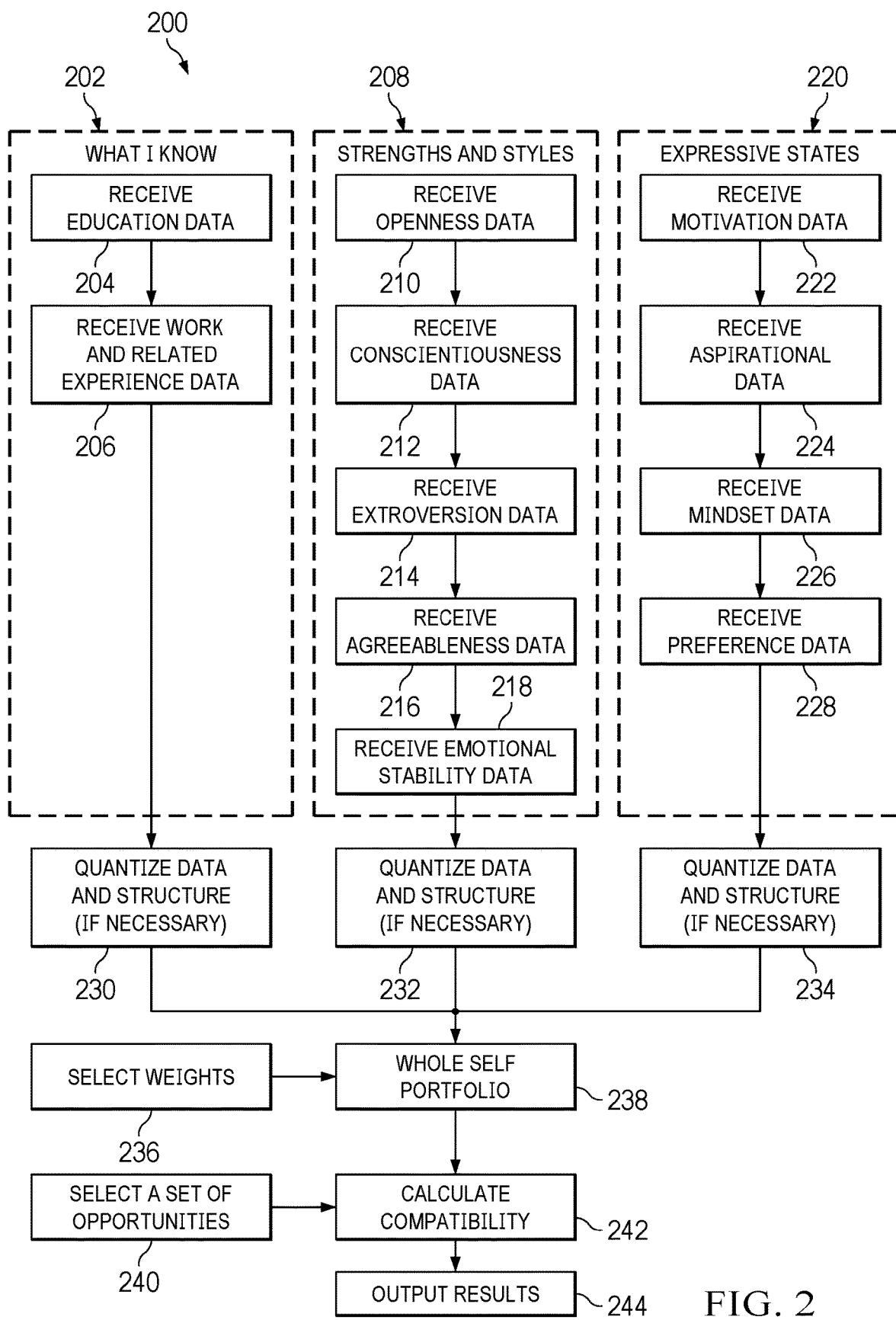
FIG. 2 is a flow diagram of an example process for deriving and applying user portfolio data in a human capital management system.

FIG. 2 is a flow diagram of an example process 200 for deriving and applying user portfolio data in a human capital management system. Operations of process 200 are described below as being performed by one or more components of the system 100 described above with respect to FIG. 1. For example, the process 200 can be executed by the employee management system 102 of FIG. 1. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium. Execution of the instructions causes one or more data processing apparatus to perform operations of the process 200. In some implementations, the example process 200 can include additional, fewer, and/or different operations.

As shown in FIG. 2, the example process 200 describes how different sets of user information are received, derived, and used within a human capital management system (such as the employee management system 102 in FIG. 1). At 202, information about "What I Know" is received. Receiving information about "What I Know" can include receiving education data (204) and receiving work and related experience data (206).

Information about "What I Know" can include data related to an individual's skills and expertise (such as, skills, experience, education, certification, languages, publications, and awards). Information about "What I Know" can be received from one or more data sources. For example, skills, competencies, and capabilities of an employee can be obtained and inferred from employee input (such as entries in a job application form), human resources information system (HRIS) sources (such as, employee activities, achievement records, projects, learning and development, team activities, and goal achievement), and peer or manager feedback. A combination of various inputs can be used for What I Know, and may vary between organizations, as well as between different users in the same organizations. It should also be noted that both structured and unstructured data may comprise What I Know data. As noted earlier, if the user is directly answering a prompt such as, "What is your highest degree?", the response can be stored as structured data as it can be associated with an appropriate label such as, "HighestDegree." However, in other cases, the data may be received in unstructured form, such as an electronic image of a document, where the data will need to be extracted and stored in a structured format as through a context analyzer.

At 208, information about "Strengths and Styles" is received. Receiving information about "Strengths and Styles" can include receiving openness data (210), receiving conscientiousness data (212), receiving extroversion data (214), receiving agreeableness data (216), and receiving emotional stability data (218).

Information about "Strengths and Styles" can include data related to an individual's innate traits (such as the Big Five personality traits) that affect how individuals behave at work or other environments. Information about "Strengths and Styles" can be received through any suitable manner, including personality tests, self-evaluations, and observed behavior capture. For example, the information can be gathered directly from user input. In some instances, the information can be automatically obtained through validated psychometric assessments. The assessments may include reviews, personality tests (such as the Big Five personality test), and other suitable forms. The assessments may be administered within or outside an organization, and may vary based upon desired attribute types (such as, innate strengths for leadership, interpersonal communications, team dynamics, and approaches to work and problem-solving). A combination of inputs may be received for different users, depending on the inputs required and the inputs completed. Most of this data is collected directly from the evaluation conducted after the user inputs his or her responses to direct prompts and, as such, it is structured data. However, some of the data may come from co-worker observations and/or other data in format that may be unstructured, and which would need to be analyzed to provide structure around it.

At 220, information about "Expressive States" is received. Receiving information about "Expressive States" can include receiving motivation data (222), receiving aspirational data (224), receiving mindset data (226), and receiving preference data (228). These states (such as, motivation, aspirational, mindset, and preference) can be developed by in-house organizational psychology subject matter experts (SMEs), and provide employees with multiple ways to express who they are beyond their job skills and abilities. One way to obtain this data is to provide a questionnaire to a user and record his or her answers. Once recorded, those answers can be analyzed to form a dataset related to the user's motivations, aspirations, mindset, and preferences.

Information about "Expressive States" can include data related to an individual's interests, motivations and preferences. The information can help the individual set future intentions and establish goals, and can be used to match the individual to future opportunities (such as, projects, assignments, career paths, learning/training, and development programs). The information can be received through any suitable manner, including personality tests, personal feedback forms, self-evaluations and submissions, and informal discussions. In some implementations, the information can be automatically gathered directly from user input. For example, after an employee completes a learning course, the system can ask the employee if he or she would like to mark the learned skill as his or her interest or as an aspiration achieved. The information can also be automatically inferred from solution behavior. For example, if an employee searches on skills related to a particular skill (such as statistical analysis), the system can infer and validate with the employee if the particular skill is his or her interest. In some instances, the system can provide employees with the ability to explore, consider, and/or direct input their interests, preferences, motivators, and/or aspirations. Like other data, Expressive States data can be received in both structured and unstructured form.

At 230, information about "What I Know" can be quantized as necessary. Additionally, structure can be added to the data, if needed. For example, the system can quantify specific skills of an employee from the entry level (e.g., level 1) to the expert level (e.g., level 5). In some cases, the quantization can be inferred by the system when the employee demonstrates his or her expertise in knowledge forums, question and answer (Q&A) forums, Sharepoint, or other channels. As an example, an employee with less than 2 years of work experience may be assigned via quantization to Level 1. The employee may be able to review and curate the quantization.

At 232, information about "Strengths and Styles" can be quantized as necessary, with structure added as necessary. At 234, information about "Expressive States" can be quantized as necessary, and can have structure added, if needed. Any suitable data quantization or structure addition methods can be used. The data quantization and structure addition steps at 230, 232, and 234 are optional, and can be performed if data quantization and structure are needed by the following operations.

At 236, a set of weights can optionally be selected by the user. These weights are associated with passions of the user where the user can highlight a particular element of the whole self portfolio based on what the user feels most strongly about.

At 238, the data from What I Know 202, Strengths and Styles 208 and Expressive States 220 is combined together to form the whole self portfolio. By combining all three sets of data, the whole self portfolio provides a better representation of the person over simply using the What I Know data along. The received data can be processed through the machine learning model to generate a set of user data (i.e., a whole self user portfolio) related to each different user or employee. The user portfolio can provide an intelligent assembly of multiple data sources designed to create current, fluid, and up-to-date stories of individuals and their future directions.

At 240, a set of opportunities can be identified or selected, whether manually or automatically, to be evaluated for potential matches for a particular user or employee, or for a larger set of users or employees. For example, the set of opportunities can include a single opportunity, such as a new job opportunity, a particular skill learning course, and a certain career path. The set of opportunities can include new job postings in a department, set of classes in an area (e.g., management classes of all levels and types) and varied career paths.

At 242, compatibility with the set of opportunities can be calculated for each user based on the whole self portfolio. For example, the machine learning model can automatically process each opportunity profile for each user based on the corresponding user whole self portfolio, and calculate the compatibility with the opportunity for each user.

At 244, a set of results can be output. For example, the results can include a percentage match, indicating a relative level of match between a particular user and one or more opportunities. In some instances, results for multiple of users can be generated at one time (e.g., simultaneously or concurrently), and can be provided to a manager or an administrator, or alternatively, to one or more users being evaluated. These evaluated users may receive their own scores and, in many cases, may not receive other users' scores. If a team manager or other person is running the calculation, they may receive a set of scores or results for one or more users. The one or more users may include only those who have a matching score above a particular predefined threshold (such as 90%) for a position or role. In other instances, all or a larger set of scores may be received. In still other instances, only the highest score (or a subset of scores close to the highest score) may be returned. The set of results can be presented through any suitable mechanism. In some instances, hiring, promotion, and team selection decisions, as well as application submissions or similar notifications, may be suggested or proposed in a potentially automatic manner in response to the output generation. In most cases, while suggestions may be made using the output, supervisors and others related to human resource management may receive and consider the data in their decisions. In some instances, the output may provide a suggestion or selection of a subset of candidates recommended for consideration. In those cases, a person or group of persons may review and consider those candidates, using those recommendations as one facet of any HR-related decisions.

In some implementations, the output can be used to provide a variety of machine learning recommendations for suitable opportunities, teams, or career goals and/or actions. For example, the output can be used to present these recommendations directly to a user or employee for selection. In some instances, the output may result in automated actions, such as adding a user to a particular team or adding the user to a candidate pool for new opportunities. Other automated actions can also be performed. Learning mechanisms can be used to identify which recommendations are accepted and rejected, update user information and the machine learning recommendations, and train the machine learning model to update its recommendations.

The example process 200 can be used to recommend opportunities directly to a user. By using the whole self user portfolio, the example process 200 does not provide recommendations based solely on job qualifications (such as educational and work experience), but rather on the likelihood that the user will be interested in a given opportunity.

The example process 200 can create a meaningful and motivating work experience, and create the right conditions for employee development by using relevant data throughout the employee experience. So far, employers lack this rich data set (e.g., the whole self user portfolio) to identify appropriate opportunities for employees, to inform employees of their future directions, and even to assess employees' suitability of their current roles. By using the whole self user portfolio, employers can move from a one-size-fits-all talent strategy to recognizing and valuing each individual's strengths and uniqueness, thereby optimizing performance, impact, organizational commitment, innovation, creativity, and job satisfaction.

For example, the whole self user portfolio can be used to match employees to organizational opportunities (e.g., projects, assignments, job roles, skills, learning courses, experiential learning, mentors, skill trainers, volunteers, interest communities, and social opportunities). This matching can be performed by a machine learning model, and enriched by employee behavior and explicit input. Examples of employee input include "Show me opportunities which help me achieve my career goal of moving into management" or "Show me opportunities related to the skill interest of project management." Based on employee input, the machine learning model can determine if an employee is interested in opportunities related to a particular career path, and perform opportunity matching accordingly. In some implementations, the machine learning model can be trained with usage patterns and feedbacks. For example, the usage patterns include an employee always selecting theoretical types of learning (such as, books, courses, and articles), or always searching for specific skills (such as, social marketing and brand marketing). An example of employee feedback includes "I am not interested in this opportunity because it does not match my career interests."

The whole self user portfolio can also be used to inform employees of their career development. The dynamic nature of work requires a continuous growth or learning mindset. The skills employees need to get their jobs done are developing rapidly. As a result, career development and the evolution of skills and mindsets are the foundation for individual and organizational success. The whole self user portfolio can be used to match and provide opportunities for career development and career paths. For example, using the whole self user portfolio, a machine learning model can provide employees with skills, competencies, or mindset recommendations, provide transparency on career paths that match employees' skills and aspirations, and provide employees with content and information to achieve their goals.

The whole self user portfolio can also be used to discover employees' hidden talents. For example, the whole self user portfolio can be used to identify individuals who have the right skills, mindsets, and working styles to perform a role or contribute to a dynamic team. If an organization's leader wants to develop high-value skills and capabilities in the workforce, the whole self user portfolio can provide the leader with a way to search for people with the right aspiration. Similarly, the whole self user portfolio can help a project manager find people with certain traits (such as, thinking creatively and conceptually). In addition, recruiters can use the whole self user portfolio to form and create an internal mobility talent pool.

The whole self user portfolio can also be used to form an optimal team. Team effectiveness and quality begin with the right combination of skills, strengths, and diversity of thought. Although age/race/gender diversity has been shown to be related to team performance, a more comprehensive view of a team, including team members' strengths and styles, can provide more perspectives and approaches on team performance. As a multi-dimensional and complete user data set, the whole self user portfolio can provide a comprehensive view of the team, and can be used by a team leader to find the right team members to form the optimal team. In general, algorithms can be used to also provide recommendations to HR, managers, assignment leaders, recruiters, and workforce planners. One such example includes a candidate matching algorithm used to compare candidate profiles with job requisitions which are tagged with whole self attributes. These opportunities for HR to match or find employees can be included in various implementations of the solution.

The whole self user portfolio can also be used for team building and cohesion. Team cohesion, or the level of personal intimacy within a team, has proven to have a positive impact on the team's effectiveness. By allowing team members to share their whole self portfolio information with each other, the team can better understand who each member is, what capabilities team members bring to the team, how team members work, and passions of team members. Providing this knowledge to team members can help the team work together better, reduce conflict, and improve team efficiency.

The whole self portfolio is also an invaluable tool for the individual user. The Expressive States can change over time. Something that did not matter to an individual in the past may become more important with time. As an example, a new employee may not have any aspirations or motivations to being a manager of other people. Over time, that may change. Being able to automatically detect a shift in an employee's changes in the Expressive States allows for the bringing of the right opportunity to the right employee at the right time and thus keep the employee more engaged with his or her employer. Changes in Expressive States can be changed explicitly by the user, or alternatively, may be implicitly updated based on particular actions of the users, interpretations of user activity, or other indirect shifts in user behavior or actions over time.

The whole self model data can also be updated with inputs from various HR systems (e.g., SAP's SuccessFactors) and other relevant systems. For example, achievement of key results in objectives and key results (OKRs) from dynamic teams can be included as inputs to the whole self model, including the "What I Know" portion of experience data. If an employee was listed a contributor to a key result in an OKR, the data will be sent to the whole self user portfolio as a source for inference. This can also apply to other data, such as goals achieved or development goals, which could provide insights into what the employee knows and what they aspire to learn. Other examples include learning courses completed. The courses completed could, for example, infer either or both of a skill or a mindset of the user.

Figure 3:
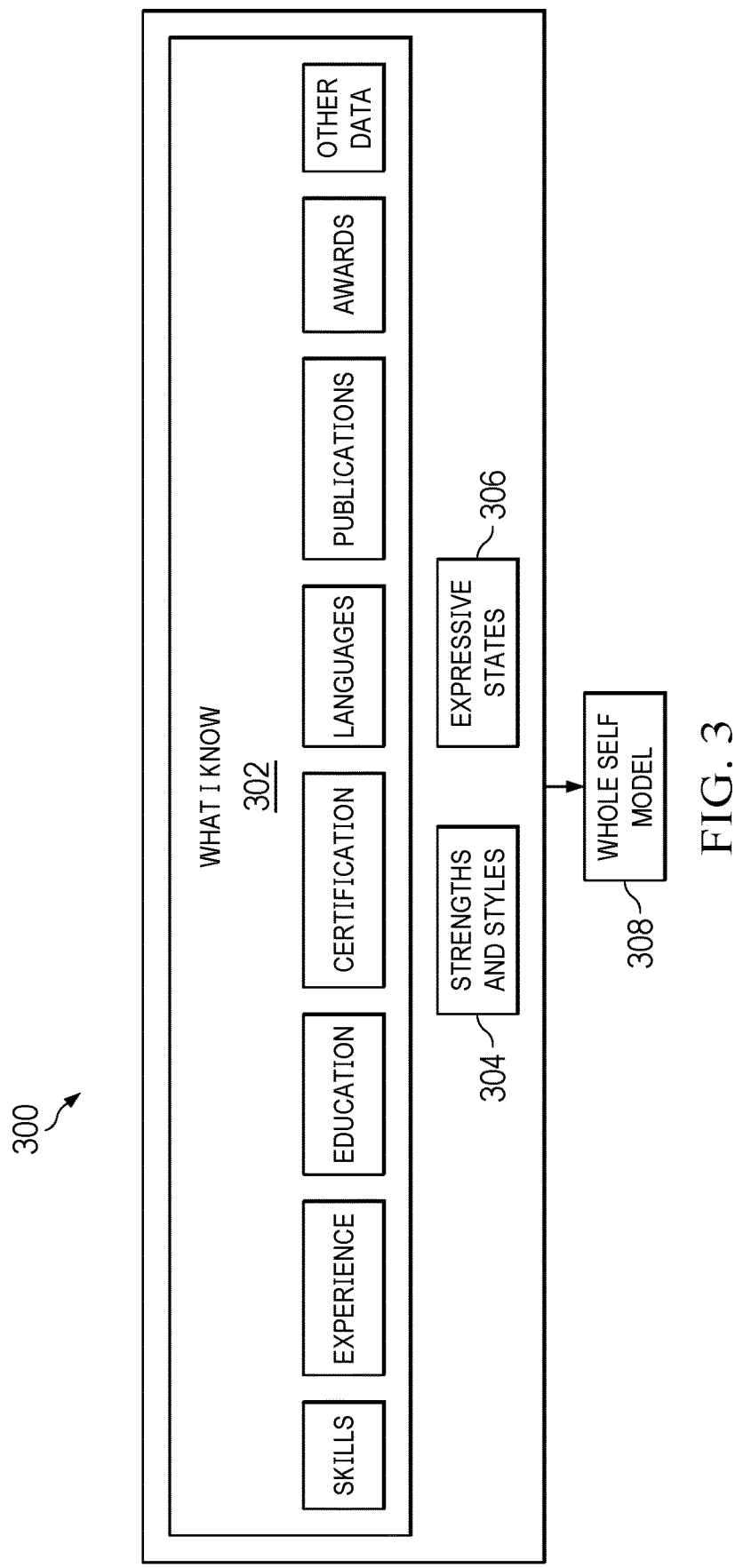
FIG. 3 is a block diagram illustrating an example user portfolio.

FIG. 3 is a block diagram illustrating an example whole self user portfolio 300. A whole self user portfolio can include different sets of user data related to different user aspects, and can provide a multi-dimensional and holistic view of the user. As illustrated in FIG. 3, the example user portfolio 300 includes user data of "What I Know" 302, "Strengths and Styles" 304, and "Expressive States" 306. In some implementations, the example whole self user portfolio 300 can include additional sets of user data, fewer sets of user data, and/or different sets of user data.

A first set of user data (i.e., "What I Know" 302) can include user experience data related to an individual's capability and proficiency level. For example, data of "What I Know" 302 can include one or more of skills (such as, technical skills and professional skills), experience (such as, work experience and volunteer experience), education (such as college degree and major), certification, languages, publications, awards, and other data (such as patents).

A second set of user data (i.e., "Strengths and Styles" 304) can include user personality data related to an individual's innate traits. The innate traits affect how individuals behave at work or other environments. The innate traits can be evaluated using scientifically validated psychometric assessments, and generally remain stable over time. For example, data of "Strengths and Styles" 304 can include one or more of creativity, discretion, and nurturing.

A third set of user data (i.e., "Expressive States" 306) can include user data related to an individual's interests and preferences, which may change over time. For example, data of "Expressive States" 306 can include one or more of work preferences (such as, preferred work location, core work hours, work travel, and communication methods) and other variable data (such as, interests, aspirations, motivations, and mindsets). Taken together, this whole self user data can help individuals set future intentions and establish goals, and can be used to match individuals to current and future opportunities (such as, projects, assignments, career paths, learning/training, and development programs).

As illustrated in FIG. 3, user data of "What I Know" 302, "Strengths and Styles" 304, and "Expressive States" 306 are combined into a whole self model 308. For example, a machine learning model can be used to combine different sets of user data into the whole self model 308.

The whole self model 308 includes a multi-dimensional and complete user data set (i.e., a user portfolio) representing a combination of skills learned, natural talents or traits, and drivers of motivation and psychological engagement. The complete view of an individual's optimal fit to role, assignment, or opportunity, lies in the combination of motivations, strengths, preferences, experience, competencies, and future direction. As a result, the whole self model 308 provides an intelligent assembly of multiple data sources designed to create current, fluid, and up-to-date stories of individuals and their future directions.

The whole self model 308 is provided to allow for various machine learning recommendations, which can be used based on an opportunity, to determine suitable job openings, learnings, teams, or career goals and/or actions. In some implementations, a user can curate what is important in the opportunity by adding weights to the opportunity profile to drive the recommendations. The output of the whole self model 308 can be used to provide and present those recommendations. For example, the recommendations can include matching opportunities, learning opportunities, and career paths. Matching opportunities can include opportunities for employees in similar roles. Learning opportunities can be what employees with similar interest, aspirations, strength, and/or roles learn. Career paths can be recommended based on employee's internal history or external data. In some instances, the whole self model 308 may cause automatic actions to be taken, such as adding a user to a particular team or adding the user to a candidate pool for new opportunities. In other instances, an employee may have his actions tracked, such as when using a work-based application or Web searching, to determine if his Expressive States have shifted by comparing the recent activity to the stored Expressive States used to generate the whole self model 308. If an appreciable shift is detected beyond a threshold, the whole self model 308 can be regenerated later in time and then used to compare it against current opportunity profiles. In this way, current opportunities can be matched to the individual as he is today, and not to as he was in the past. Other automatic actions are also possible. Learning mechanisms can be used to identify which recommendations are accepted and rejected, update both the user's information and the machine learning recommendations, and train the whole self model 308 to update its recommendations.

Figure 4:
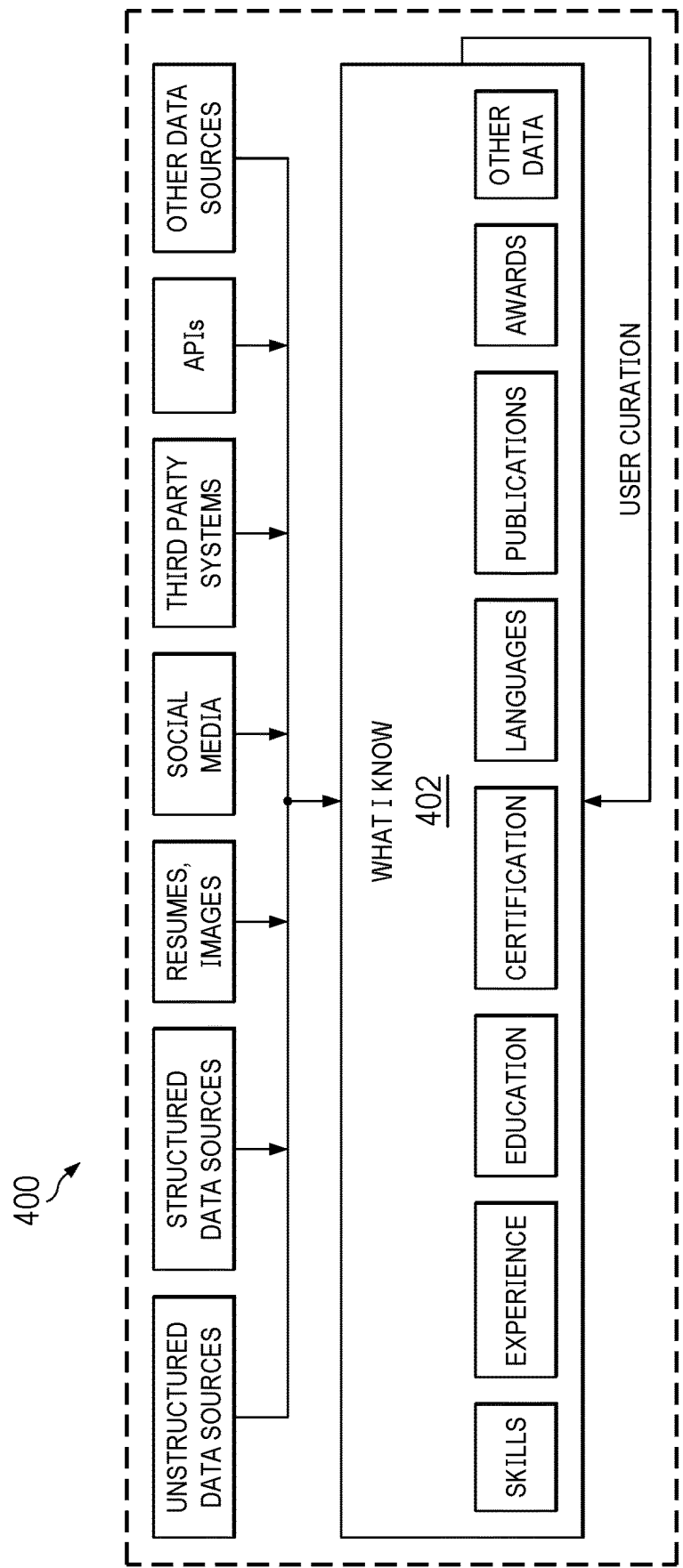
FIG. 4 is a block diagram illustrating one example aspect of a user portfolio.

FIG. 4 is a block diagram illustrating one example aspect 400 of a user portfolio. As illustrated in FIG. 4, the example aspect 400 includes user data of "What I Know" 402, and relates to an individual's skills and expertise. For example, "What I Know" 402 can include one or more of skills, experience, education, certification, languages, publications, awards, and other data.

The user data of "What I Know" 402 can be obtained from one or more data sources, and stored in a database (such as educational and work experience data 110 of FIG. 1). For example, skills, competencies, and capabilities of an employee can be obtained and inferred from employee input (such as entries in a job application form), human resources information system (HRIS) sources (such as, employee activities, achievement records, projects, learning and development, team activities, and goal achievement), interpreting unstructured data such as documents, messages, announcements or papers, and peer or manager feedback.

As illustrated in FIG. 4, any suitable unstructured data source, structured data source, resume and image, social media, third party system, and application programming interface (API) can be used to obtain the user data of "What I Know" 402. For example, Natural Language Processing (NLP) techniques can be used to obtain user data from unstructured data associated with the user. Optical character recognition (OCR) and/or NLP techniques can be used to obtain user data from user resumes and images. Additional user data can be obtained from social media (such as Facebook, LinkedIn, and Twitter), one or more third party systems, and APIs associated with one or more other data sources or systems. Any suitable alternative sources may also be used, and can be provided to the whole self model, such as via suitable API calls, or other methods of communication.

As illustrated in FIG. 4, user curation can be used to adjust or update information comprised in the user data of "What I Know" 402. For example, a user may be able to review and curate information in the obtained user data, as well as provide specific feedback and updates through self-evaluations and/or questionnaires. In some cases, the feedback and updates can be obtained from verified credentials of the user (such as, certifications, classes, and badges).

Figure 5:
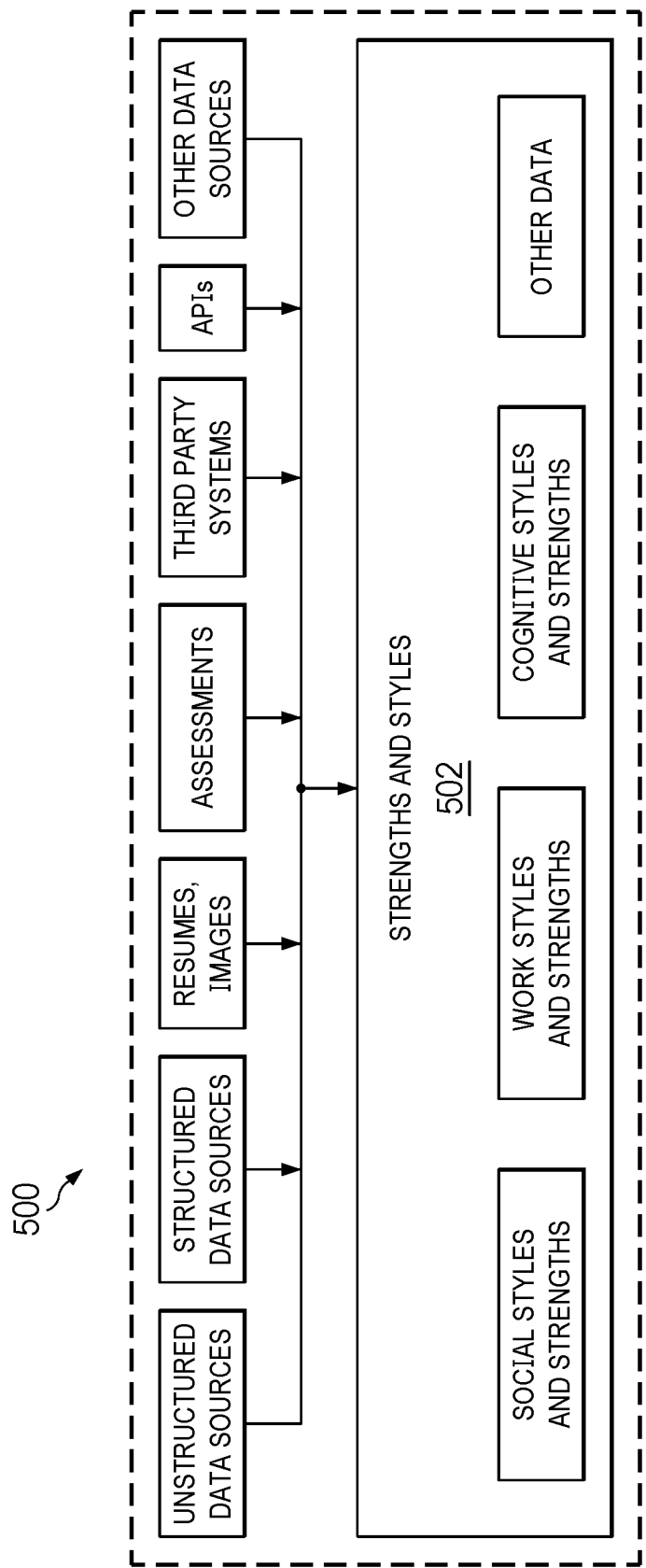
FIG. 5 is a block diagram illustrating another example aspect of a user portfolio.

FIG. 5 is a block diagram illustrating another example aspect 500 of a user portfolio. As illustrated in FIG. 5, the example aspect 500 includes user data of "Strengths and Styles" 502, and relates to an individual's innate traits. For example, "Strengths and Styles" 502 can include one or more of personality dimensions, openness, emotional stability, agreeableness, and other data. As illustrated, various information, including social styles and strengths, work styles and strengths, cognitive styles and strengths, and other data, can be included in the "Strengths and Styles" 502.

The user data of "Strengths and Styles" 502 can be obtained from one or more data sources, and stored in a database (such as strengths and styles data 112 of FIG. 1). As illustrated in FIG. 5, any suitable unstructured data source, structured data source, resume and image, assessment, third party system, and API can be used to obtain the user data of "Strengths and Styles" 502. For example, the user data of "Strengths and Styles" 502 can be gathered directly from user input. In some instances, the user data of "Strengths and Styles" 502 can be obtained through validated psychometric assessments. The assessments may include reviews, personality tests (such as the Big Five personality test), and other suitable forms. The assessments may be administered within or outside an organization, and may vary based upon desired attribute types (such as, innate strengths for leadership, interpersonal communications, team dynamics, and approaches to work and problem-solving). Additionally, at least a portion of the data for "Strengths and Styles" 502 may be inferred from available information.

As illustrated in FIG. 5, NLP techniques can be used to obtain user data from unstructured data associated with the user. OCR and/or NLP techniques can be used to obtain user data from user resumes and images. Additional user data can be obtained from one or more third party systems, and APIs associated with one or more other data sources or systems. Any suitable alternative sources may also be used, and can be provided to the whole self model, such as via suitable API calls, or other methods of communication.

Figure 6:
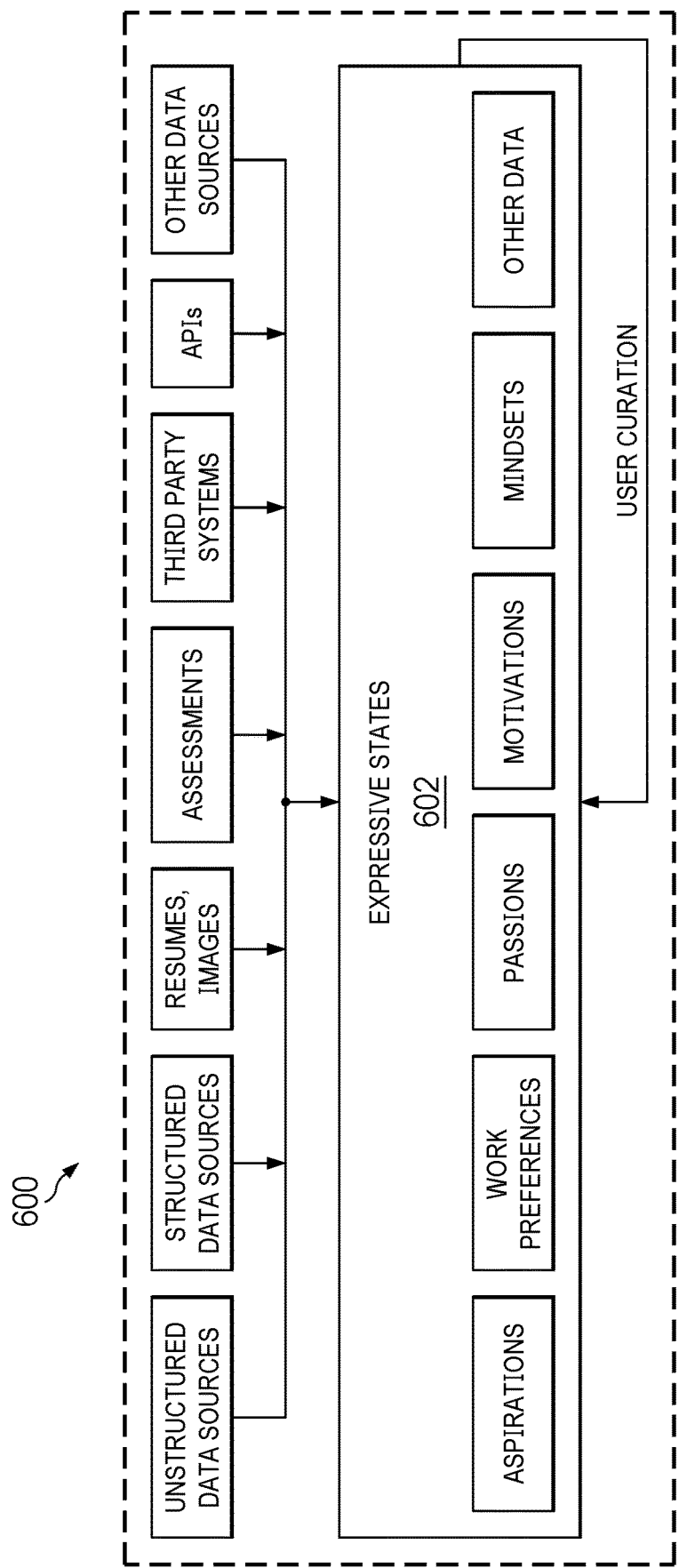
FIG. 6 is a block diagram illustrating another example aspect of a user portfolio.

FIG. 6 is a block diagram illustrating another example aspect 600 of a user portfolio. As illustrated in FIG. 6, the example aspect 600 includes user data of "Expressive States" 602, and relates to an individual's interests and preferences. "Expressive States" 602 can help individuals set future intentions and establish goals, and can be used to match individuals to future opportunities (such as, projects, assignments, career paths, learning/training, and development programs). For example, "Expressive States" 602 can include one or more of motivations, aspirations, mindsets, work preferences, passions, and other data. In some implementations, these states can be developed by in-house organizational psychology subject matter experts (SMEs), and provide employees with multiple ways to express who they are beyond their job skills and abilities.

Motivations are factors that drive people to work hard and succeed. Examples of motivations are shown in Table 1 below.

TABLE 1

Examples of Motivations

| Employee Motivation | Description |
| --- | --- |
| Explore | "I want to try new things" |
| Learn | "I want to learn something new" |
| Grow | "I want to work on developing my skills" |
| Earn | "I want to feel well-compensated for my efforts" |
| Help | "I want to help others" |
| Achieve | "I want to feel accomplished" |
| Be recognized | "I want to feel recognized for my work" |

TABLE 1-continued

Examples of Motivations

| Employee Motivation | Description |
| --- | --- |
| Influence | "I want to make a tangible impact on the direction of my organization" |

Aspirations are defined as a long-term career related goals. Aspirations may be related to the development of an individual's current role or development outside of the individual's current role. Aspirations are not exclusively locked into a taxonomy. In some instances, NLP intelligence may convert text aspirations, such as those included below, as meaningful elements of the whole self. In instances where taxonomies are used, those taxonomies can be modified by and are customizable for the organization. Examples of aspirations are shown in Table 2 below.

TABLE 2

Examples of Aspirations

| Aspiration | Description |
| --- | --- |
| Aspire to be a People-Leader | "I aspire to take on a leadership role within my career" |
| Aspire to change career | "I aspire to move into a different career than the one I am in now" |
| Aspire to be a skill expert | "I aspire to be an expert in a skill that I currently have" |
| Aspire to mentor | "I aspire to be a mentor to others" |
| Aspire to be 'High Potential' | "I aspire to be considered a high potential employee" |
| Aspire to be a job/role expert | "I aspire to be promoted to the next level of my current job role" |

Mindsets are defined as work attitudes, beliefs, or methods. Mindsets are similar to personal work values. Similar to aspirations, mindsets are not exclusively locked into a taxonomy. Examples of mindsets are shown in Table 3 below.

TABLE 3

Examples of Mindsets

| Mindsets | Description |
| --- | --- |
| Inclusive Mindset | "I value making work more inclusive" |
| Achievement mindset | "I always keep achieving results in the front of my mind" |
| Resilience mindset | "I make sure we have back-up and contingency plans" |
| Community mindset | "I value work that has an impact on my community" |
| Accountability mindset | "I value accountability from myself and others" |
| Innovation Mindset | "I try to make sure we are always coming up with novel ideas" |
| Integrity Mindset | "I value honesty and integrity in myself and others" |
| Global Mindset | "I am always thinking about how things will work in different cultures" |
| Sustainable Mindset | "I value long-term sustainability over short-term results" |
| Connector Mindset | "I value making connections across the business" |
| Customer First Mindset | "I always put the needs of the customer first" |
| Growth Mindset | "I consistently try to improve my current knowledge and skills" |

Work preferences are defined as preferences that best suit the type of work environment that a particular individual has. Examples of work preferences are shown in Table 4 below.

TABLE 4

Examples of Work Preferences

| Preferences | Description |
| --- | --- |
| Travel preference | "I am willing to travel up to X % for work" |
| WFH preference | "I prefer to work X number of days/weeks in a remote environment" |
| Team vs. individual work preference | "I would like my work to require collaboration with others (never to always)" |
| Core hours preference | "My core work hours are from Xam to Xpm" |
| Meeting time preference | "I prefer to meet early in the day/early afternoon/late afternoon/end of the day" |
| Integration vs. segmentation | "I prefer my work and home life to have clear separation/blended together" |
| Communication modality preference | "I prefer to work synchronously/asynchronously" |
| Reward type preference | "I prefer base salary/stock options/other compensation" |
| Learning modality preference | "I prefer in-person learning/video courses/hands-on experiences" |
| Internal vs. external | "I like working directly with customers/clients (never to always)" |

Passions are not bound to a particular taxonomy. Instead, passions are modifiers that can be added to any element of the whole self user portfolio to indicate that the user feels particularly strong about that element (e.g., selecting weights 236 in FIG. 2). For example, a user may be passionate about a particular skill or a mindset. A passion indicator on an element indicates that when providing recommendations to the user, more attention or weights should be paid to that element of the user portfolio. In some implementations, a user can select one or more states comprised in the "Expressive States" 602 as his or her "top state" (e.g., strongest motivation) at any given time. In some instances, data collected from the "Expressive States" 602 can be a binary mechanism that can be integrated into algorithms to provide recommendations.

The user data of "Expressive States" 602 can be obtained from one or more data sources, and stored in a database (such as motivation and preference data 114 of FIG. 1). As illustrated in FIG. 6, any suitable unstructured data source, structured data source, resume and image, assessment, third party system, and API can be used to obtain the user data of "Expressive States" 602. In some implementations, the user data of "Expressive States" 602 can be gathered directly from user input. For example, after an employee completes a learning course, the system can ask the employee if he or she would like to mark the learned skill as his or her interest or aspiration. The user data of "Expressive States" 602 can also be inferred from solution behavior. For example, if an employee searches on skills related to a particular skill (such as statistical analysis), the system can infer and optionally validate with the employee if the particular skill is his or her interest. If an employee spends some time on a particular website offered by other information server 144 in FIG. 1 as tracked by customer application 140, the public content of that website can be analyzed and an inference can be made that the content therein is correlated to a passion of the employee. This information can then be used to adjust the whole self portfolio 238. In some instances, the system can provide employees with the ability to explore, consider, and/or direct input their interests, preferences, motivators, and/or aspirations.

In some implementations, the system can infer training skills and/or preferred training time for an employee based on past training history of the employee. The system can infer an employee's interest and/or passion based on events in the employee's calendar. The system can infer an employee's aspiration when the employee explores a job or fellowship listed in the system.

As illustrated in FIG. 6, the user data of "Expressive States" 602 can be obtained through validated psychometric assessments. The assessments may include reviews, questionnaires, surveys, and other suitable forms. The assessments may be administered within or outside an organization. NLP techniques can be used to obtain user data from unstructured data associated with the user. OCR and/or NLP techniques can be used to obtain user data from user resumes and images. Additional user data can be obtained from one or more third party systems, and APIs associated with one or more other data sources or systems. As an example, a user may invoke customer application 140 to interact with other information servers 144. Customer application 140 may track the interactions and record the interactions for processing. The recordation may include things such as entries typed by the employee, images of screen shots presented to the employee and metadata associated with the responses provided by the other servers 144. This information can then be forwarded to context analyzer 126 to derive one or more Expressive States 602 of the employee at that time. Once the current Expressive States of the employee have been determined, the current Expressive States can be compared to the previously stored Expressive States (e.g., Motivation and Preference Data 114 in FIG. 1) stored in memory 108 of FIG. 1 for deviations above a threshold. If there are deviations above a threshold, the whole self portfolio can be updated and compared against current opportunities to determine if any current opportunities are a good match for the employee based on her updated whole self portfolio. Any suitable alternative sources may also be used, and can be provided to the whole self model, such as via suitable API calls, or other methods of communication.

As illustrated in FIG. 6, user curation can be used to adjust or update information comprised in the user data of "Expressive States" 602. For example, a user may be able to review and curate information in the obtained user data, as well as provide specific feedback and updates through self-evaluations and/or questionnaires. This can be particularly helpful if the user periodically reviews his own whole self portfolio and believes it is out of date with his current feelings. If this occurs, providing updated Expressive State 602 data to update the whole self portfolio is warranted.

Figure 7:
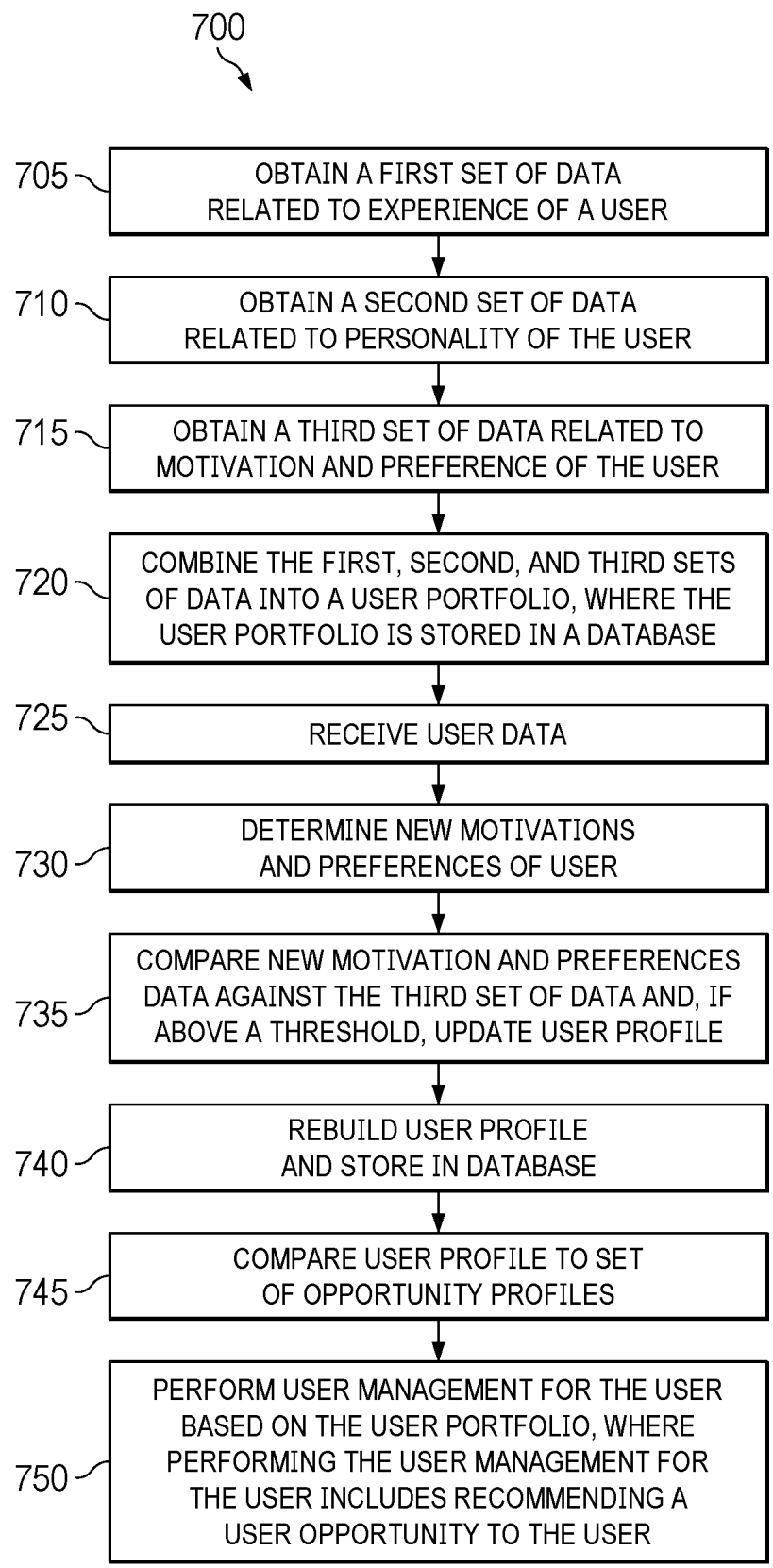
FIG. 7 is a flowchart of an example method for obtaining a user profile to assist in human management issues.

FIG. 7 is a flowchart of an example method 700 for obtaining a user profile to assist in human management issues. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the employee management system 102 of FIG. 1.

At 705, a first set of data related to experience of a user (such as an employee) is obtained. For example, the first set of data is related to educational and work experience of the user, and includes data associated with one or more of technical skills, professional skills, competencies, formal education, work and volunteer experience, badges, certifications, credentials, and patents. The first set of data can be obtained from one or more data sources. For example, skills, competencies, and capabilities of an employee can be obtained and inferred from employee input (such as entries in a job application form), human resources information system (HRIS) sources (such as, employee activities, achievement records, projects, learning and development, team activities, and goal achievement), and peer or manager feedback.

At 710, a second set of data related to personality of the user is obtained. For example, the second set of data is related to strengths and styles of the user, and includes a core set of personality traits of the user. The core set of personality traits can include openness to experience, conscientiousness, extraversion, agreeableness, and neuroticism. The second set of data can be obtained from personality tests (such as the Big Five personality test), self-evaluations, and observed behavior capture.

At 715, a third set of data related to motivation and preference of the user is obtained. For example, the third set of data can include data associated with one or more of work preferences, interests, aspirations, motivations, and mindsets. The third set of data can be gathered directly from user input. For example, after an employee completes a learning course, the system can ask the employee if he or she would like to mark the learned skill as his or her interest or aspiration. In some instances, the system can provide employees with the ability to explore, consider, and/or direct input their interests, preferences, motivators, and/or aspirations.

In some implementations, the first, second, and third sets of data are obtained from different data sources. For example, the first set of data is obtained from one or more social media accounts of the user, the second set of data is obtained from a third-party system providing a psychological test, and the third set of data is obtained directly from the user.

At 720, the first, second, and third sets of data are combined into a user profile. The user profile can be stored in a database (such as an employee database). For example, in some instances a weight for each of the first, second, and third sets of data may be obtained, and the obtained weights and the first, second, and third sets of data are processed through a machine learning model to generate the user profile. The user profile can be used to describe the user. In some implementations, a user (such as, an employee, a manager, and a human resources (HR) personnel) can determine importance of different sets of data, and select different weights for different data based on their determined importance. In some instances, the weights can be automatically selected and applied by the machine learning model. In other instances, each portion of information may be weighed equally, or can be provided a similar weight in generating the whole user profile.

At 725, additional user data is received. This user data can come from tracking a user's interaction with a software application or a server such as a Web server or an email server.

At 730, a determination is made if the newly acquired data relates to a change in one of the three data sets. If a change is determined, then the newly acquired data is compared to the previously stored data at 735. Also in 735, if the newly acquired data is different from the previously stored data beyond a certain threshold, then the user profile is rebuilt inclusive of the newly acquired data at 740.

At 745, the newly rebuilt user profile is compared against one or more opportunity profiles. The comparison involves determining if aspects of the user profile are a good match with certain aspects of each of the opportunity profiles.

At 750, one or more opportunities are presented where the presented opportunities relate to the opportunity profile or profiles that had matching aspects with the user profile above certain thresholds.

In some implementations, a manager or an HR personnel can obtain the recommendation for the user. The manager or the HR personnel can contact the user, and provide the recommended opportunity to the user in person. For example, a manager completing a team or internal transfers may reach out to the user with an offer to join a project, be part of an initiative or group, or otherwise adjust their working parameters. In some cases, this data can be entered into organizational recommendation engines (such as talent marketplaces or opportunity marketplaces) to allow the user to receive recommendations without direct manager or HR intervention.

In some implementations, the opportunity includes a new project, team, skill training or leadership opportunity where the process recommends the new project, team, skill training or leadership opportunity to the user if the output result is greater than a predefined threshold (such as 90% match).

Figure 8:
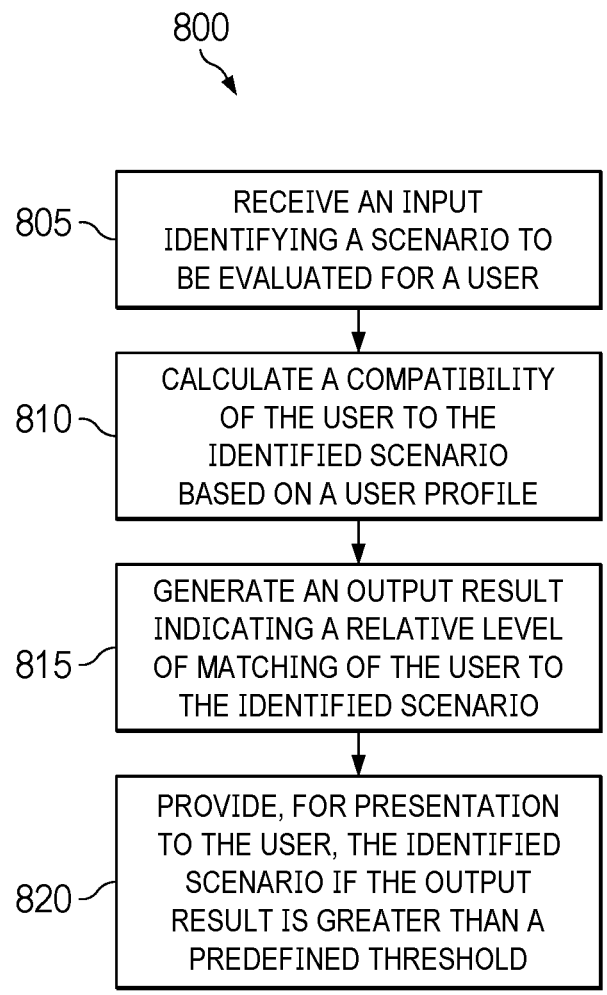
FIG. 8 is a flowchart of an example method for recommending a user opportunity.
Figure 9:
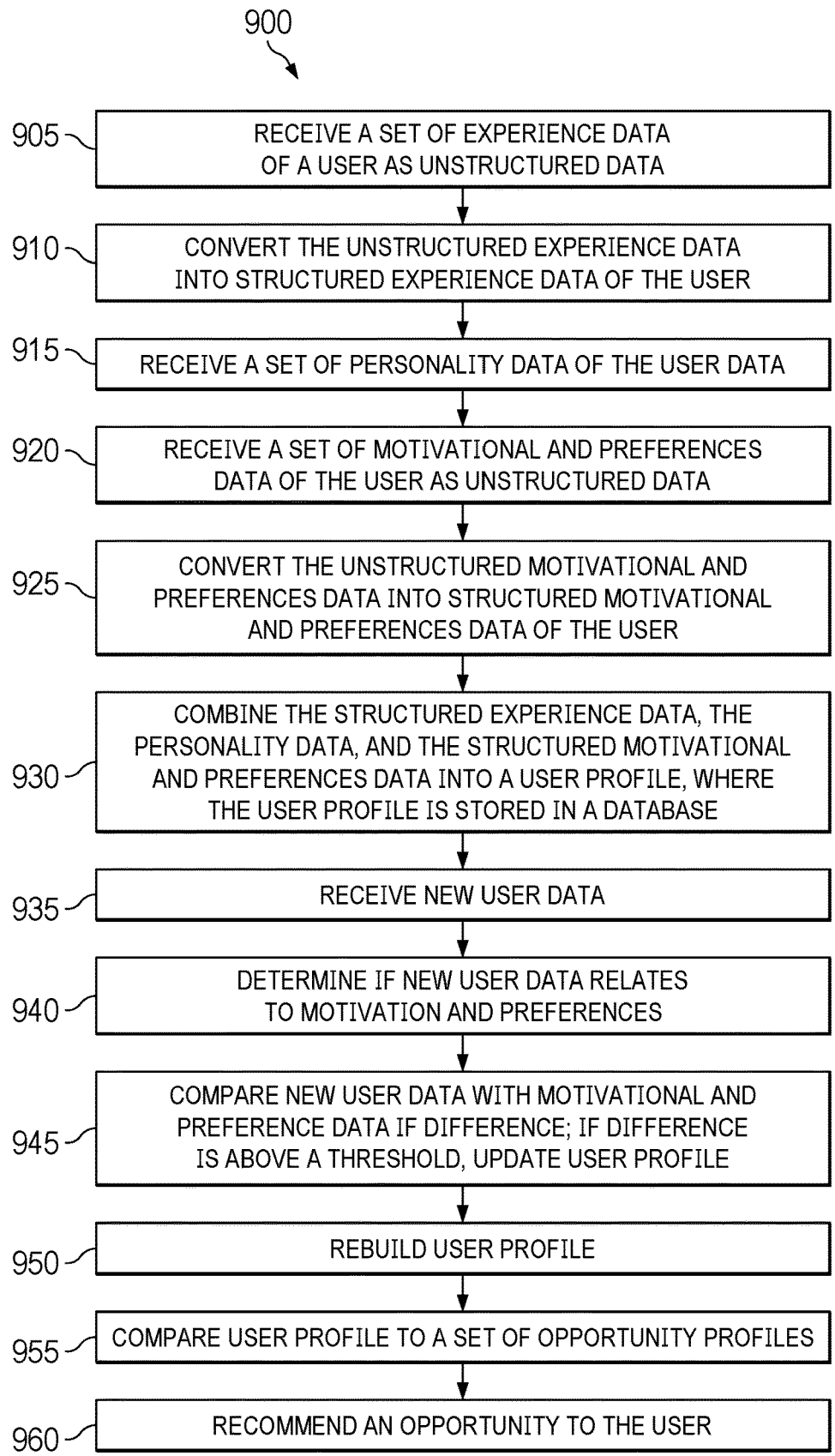
FIG. 9 is a flowchart of another example method for recommending a user opportunity.

FIG. 8 is a flowchart of another example method 800 for recommending an opportunity to a user. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the employee management system 102 of FIG. 1.

At 805, a set of experience data of a user is received as unstructured data. For example, the set of experience data is related to educational and work experience of the user, and includes data associated with one or more of technical skills, professional skills, competencies, formal education, work and volunteer experience, badges, certifications, credentials, and patents. This data can be received in various forms including paper or as an electronic document.

At 810, the unstructured experience data is converted into structured experience data of the user.

At 815, a set of personality data of the user is received. For example, the set of personality data is related to relatively strengths and styles of the user, and includes a core set of personality traits of the user. The core set of personality traits includes openness to experience, conscientiousness, extraversion, agreeableness, and neuroticism.

At 820, a set of motivational and preferences data of the user is received as unstructured data. For example, the set of motivational and preferences data includes data associated with one or more of work preferences, interests, aspirations, motivations, and mindsets. In some implementations, the set of experience data, the set of personality data, and the set of motivational and preferences data are obtained from different data sources. For example, the set of experience data is obtained from one or more social media accounts of the user, the set of personality data is obtained from a third-party system providing a psychological test, and the set of motivational and preferences data is obtained from the user.

At 825, the unstructured motivational and preferences data is converted into structured motivational and preferences data of the user.

At 830, the structured experience data, the personality data, and the structured motivational and preferences data are combined into a user profile. The user profile is stored in a database (such as an employee database). For example, a weight reflective of a user's passions for each of the structured experience data, the structured personality data, and the structured motivational and preferences data is obtained, and the obtained weights and the structured experience data, the structured personality data, and the structured motivational and preferences data are processed through a machine learning model to generate the user profile. The user profile can be used to describe the user.

At 835, new user data is received. This new user data can be generated by a user using a customer application or another server 144.

At 840, a determination is made if the received new user data relates to the set of motivational and preferences data. If it does, at 845 a comparison is made between the new user data and the motivational and preference data to determine if there is a difference in the data and, if so, if that difference is above a threshold.

If the difference is above a threshold, then at 850 an updated user profile is generated and/or rebuilt, and is stored in a database, such that a new user profile is generated using the received new user data along with the other received data.

At 855, the updated user profile is compared with a set of opportunity profiles. The comparison involves determining if aspects of the user profile are a relatively good match with certain aspects of each of the opportunity profiles. At 860, the opportunities associated with opportunity profiles that have a match with the user profile are presented as recommendations to the user.

The preceding figures and accompanying descriptions illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

What is claimed is:

1. A computer-implemented method comprising:
receiving, using application programming interface (API) calls, a set of unstructured experience data of a user from one or more social media accounts of the user;
converting, using Natural Language Processing (NLP), the set of unstructured experience data into structured experience data of the user;
receiving a set of structured personality data of the user from a third-party system providing a psychological test;
receiving a set of unstructured motivational and preferences data of the user from the user;
converting, using optical character recognition (OCR), the set of unstructured motivational and preferences data into structured motivational and preferences data of the user;
inputting the structured experience data, the structured personality data, and the structured motivational and preferences data into a machine learning model to generate a user profile, wherein the user profile is stored in a database;
receiving user data in at least one application;
comparing the user data to the structured motivational and preferences data to determine if there have been any changes;
in response to determining changes based on comparing the user data to the structured motivational and preferences data, receiving a second set of structured motivational and preferences data of the user and updating the user profile to include the second set of structured motivational and preferences data;
retrieving opportunity profiles that contains scores for opportunities;
comparing the opportunity profiles with the user profile; and
outputting an opportunity to the user based on the user profile.

2. The computer-implemented method of claim 1, wherein inputting the structured experience data, the structured personality data, and the structured motivational and preferences data into the machine learning model to generate the user profile comprises:
obtaining passion data from the user and using the passion data to apply at least one weight to at least one piece of data from either the structured experience data, the structured personality data, and the structured motivational and preferences data; and
processing the at least one weight and the structured experience data, the structured personality data, and the structured motivational and preferences data through the machine learning model to generate the user profile.

3. The computer-implemented method of claim 1, wherein outputting the opportunity to the user based on the user profile comprises:
calculating a compatibility of the user profile to a set of opportunity profiles, wherein each opportunity profile is associated with a corresponding opportunity; and
generating an output result of at least one opportunity indicating a relative level of matching of the user profile to at least one opportunity profile.

4. The computer-implemented method of claim 3, wherein the opportunity includes a new project opportunity, and outputting the opportunity to the user based on the user profile comprises automatically outputting the new project opportunity to the user if the output result is greater than a predefined threshold.

5. The computer-implemented method of claim 3, wherein the opportunity includes a new team opportunity, and outputting the opportunity to the user based on the user profile comprises automatically outputting the new team opportunity to the user if the output result is greater than a predefined threshold.

6. The computer-implemented method of claim 3, wherein the opportunity includes a new skill training opportunity, and outputting the opportunity to the user based on the user profile comprises automatically outputting the new skill training opportunity to the user if the output result is greater than a predefined threshold.

7. The computer-implemented method of claim 3, wherein the opportunity includes a new leadership opportunity, and outputting the opportunity to the user based on the user profile comprises automatically outputting the new leadership opportunity to the user if the output result is greater than a predefined threshold.

8. The computer-implemented method of claim 1, wherein the set of unstructured experience data is related to educational and work experience of the user, and includes data associated with one or more of technical skills, professional skills, competencies, formal education, work and volunteer experience, badges, certifications, credentials, and patents.

9. The computer-implemented method of claim 1, wherein the set of structured personality data is related to strengths and styles of the user, and includes a core set of personality traits of the user.

10. The computer-implemented method of claim 9, wherein the core set of personality traits includes openness to experience, conscientiousness, extraversion, agreeableness, and neuroticism.

11. The computer-implemented method of claim 1, wherein the set of unstructured motivational and preferences data includes data associated with one or more of work preferences, interests, aspirations, motivations, and mindsets.

12. A system comprising:
one or more computers; and
a computer-readable medium coupled to the one or more computers having instructions stored thereon which, when executed by the one or more computers, cause the one or more computers to perform operations comprising:
receiving, using application programming interface (API) calls, a set of unstructured experience data of a user from one or more social media accounts of the user;
converting, using Natural Language Processing (NLP), the set of unstructured experience data into structured experience data of the user;
receiving a set of structured personality data of the user from a third-party system providing a psychological test;
receiving a set of unstructured motivational and preferences data of the user from the user;
converting, using optical character recognition (OCR), the set of unstructured motivational and preferences data into structured motivational and preferences data of the user;
inputting the structured experience data, the structured personality data, and the structured motivational and preferences data into a machine learning model to generate a user profile, wherein the user profile is stored in a database;

receiving user data in at least one application;

comparing the user data to the structured motivational and preferences data to determine if there have been any changes;

in response to determining changes based on comparing the user data to the structured motivational and preferences data, receiving a second set of structured motivational and preferences data of the user and updating the user profile to include the second set of structured motivational and preferences data;

retrieving opportunity profiles that contains scores for opportunities;

comparing the opportunity profiles with the user profile; and outputting an opportunity to the user based on the user profile.

13. The system of claim 12, wherein inputting the structured experience data, the structured personality data, and the structured motivational and preferences data into the machine learning model to generate the user profile comprises:

obtaining passion data from the user and using the passion data to apply at least one weight to at least one piece of data from either the structured experience data, the structured personality data, and the structured motivational and preferences data; and processing the at least one weight and the structured experience data, the structured personality data, and the structured motivational and preferences data through the machine learning model to generate the user profile.

14. The system of claim 12, wherein outputting the opportunity to the user based on the user profile comprises:

calculating a compatibility of the user profile to a set of opportunity profiles, wherein each opportunity profile is associated with a corresponding opportunity; and generating an output result of at least one opportunity indicating a relative level of matching of the user profile to at least one opportunity profile.

15. The system of claim 14, wherein the opportunity includes a new project opportunity, and outputting the opportunity to the user based on the user profile comprises automatically outputting the new project opportunity to the user if the output result is greater than a predefined threshold.

16. The system of claim 14, wherein the opportunity includes a new team opportunity, and outputting the opportunity to the user based on the user profile comprises automatically outputting the new team opportunity to the user if the output result is greater than a predefined threshold.

17. The system of claim 14, wherein the opportunity includes a new skill training opportunity, and outputting the opportunity to the user based on the user profile comprises automatically outputting the new skill training opportunity to the user if the output result is greater than a predefined threshold.

18. A computer program product encoded on a non-transitory storage medium, the product comprising non-transitory, computer readable instructions for causing one or more processors to perform operations comprising:

receiving, using application programming interface (API) calls, a set of unstructured experience data of a user from one or more social media accounts of the user;

converting, using Natural Language Processing (NLP), the set of unstructured experience data into structured experience data of the user;

receiving a set of structured personality data of the user from a third-party system providing a psychological test;

receiving a set of unstructured motivational and preferences data of the user from the user;

converting, using optical character recognition (OCR), the set of unstructured motivational and preferences data into structured motivational and preferences data of the user;

inputting the structured experience data, the structured personality data, and the structured motivational and preferences data into a machine learning model to generate a user profile, wherein the user profile is stored in a database;

receiving user data in at least one application;

comparing the user data to the structured motivational and preferences data to determine if there have been any changes;

in response to determining changes based on comparing the user data to the structured motivational and preferences data, receiving a second set of structured motivational and preferences data of the user and updating the user profile to include the second set of structured motivational and preferences data;

retrieving opportunity profiles that contains scores for opportunities;

comparing the opportunity profiles with the user profile; and outputting an opportunity to the user based on the user profile.

* * * * *